3,113,112
PROCESS FOR PRODUCING A STABLE
SILICA SOL
Paul H. McNally, Amesbury, and Norman W. Rosenberg, Newton, Mass., assignors, by mesne assignments, to Diamond Alkali Company, Cleveland, Ohio, a corporation of Delaware
No Drawing. Filed Oct. 15, 1959, Ser. No. 846,565
5 Claims. (Cl. 252—313)

This invention relates to silica sols and to a method of preparation thereof and, more particularly, to the preparation of stable aqueous silica sols having a uniquely small average particle diameter size by means of contacting, with agitation over a predetermined period of time, a weakly acidic carboxylic cation exchanger in the hydrogen form, previously conditioned to pH values, with an aqueous solution of a soluble silicate.

The processes of this invention are specifically directed toward production of a type of sol which possesses characteristics which enable it to serve, to an optimum degree, those applications of silica sols wherein the primary contribution of the sol is its quality of adhesiveness. These characteristics also impart to such sol the highest preference for use in many resin emulsions. Sols which satisfy the requirements of high adhesiveness and adaptability toward a majority of resin emulsion systems are typically of unusually low average silica particle size and relatively low silica/alkali metal oxide mol ratios. It has been discovered in accordance with the present invention that the optimum range of average particle diameter sizes of a silica sol designed for use in system requiring a high degree of adhesiveness on the part of the sol or high adaptability toward emulsifying resins, is between about 1.0 to about 3.0 millimicrons. The optimum silica/alkali metal oxide mol ratio has similarly been found to be between about 4:1 to about 40:1. To carry out these specialized functions, a sol prepared with the required characteristics must be relatively stable against gelation and must also be of a relatively high concentration in silica, i.e., above about 10% and preferably between about 15 to 25%.

Sols heretofore have ordinarily been of the type wherein the average particle diameter size has been considerably above the preferred range, i.e., 1–3 millimicrons, with a correspondingly high silica/alkali metal oxide mol ratio. Such sols with relatively high average particle sizes are inferior with respect to these desired characteristics. A sol with an average particle diameter size of 4.0 millimicrons, for example, is theoretically only about 15% as efficient as a sol having an average particle diameter size of 2.0 millimicrons.

According to the disclosure in U.S. Patent 2,244,325, sols of relatively low uniformity with average particle sizes below about 4 millimicrons in diameter may be produced by means of passing an alkali metal silicate solution through a cation exchange column. The utility of this process is limited by the attainment in concentration of silica in a produced sol of a maximum of only about 4%, further concentration by subsequent evaporation yielding a somewhat less stable sol having silica content up to about 6.5%. Attempts to increase the silica concentration to commercially feasible levels result in gelation of the sol, signifying that sols produced thereby are not effective in applications requiring high adhesiveness and adaptability toward use in resin emulsions with respect to their silica content. Furthermore, this patented process has a further disadvantage of no regulatory technique whereby the silica/alkali metal oxide mol ratio of the resultant sol can be precisely predetermined or contained within a certain desired range.

U.S. Patent 2,588,389 describes a process for preparing a very low molecular weight silicic acid sol wherein, through addition of an alkali metal silicate solution to a cation exchanger in the hydrogen form at a pH between 0.5 and 4, a colloidal solution of silicic acid possessing approximately the same molecular weight or degree of polymerization of the original silicate solution is formed. Silicic acid sols prepared thereby cannot sustain a concentration in silica greater than about 2% and hence, coupled with an extremely low degree of polymerization, are unsuitable for applications requiring relatively concentrated silica sols with the aforementioned characteristics of adhesiveness. The sols are, moreover, not possessive of the preferred particle diameter size range, i.e., 1 to 3 millimicrons, but are below 1 and consequently subject to undesirable gelation.

U.S. Patent 2,750,345 describes a process for preparing silica sols having particle sizes between 5 and 8 millimicrons by means of heating at 100° C. silica sols having much smaller average particle diameter sizes such as may be prepared by processes described in the two aforementioned patents, 2,244,325 and 2,588,389. Such resultant sols are of too high an average particle diameter size for their use as described hereinabove.

U.S. Patent 2,631,134 describes a process for the preparation of stable silica sols by means for bringing into contact at a pH above 8, a silicate solution with a cation exchanger in the hydrogen form, said process being conducted within the temperature range of between about 60° C. to about 150° C. and producing sols having an average particle diameter size above 10 millimicrons. It is stated therein that such processes may also be run at about room temperature in order to obtain sols with smaller sized particles. However, in order to achieve the particular desired range of particle sizes, concentration and resistance to gelation toward which the sols of the present invention are directed, such a process would necessarily comprise employment of a cation exchanger previously preconditioned to a pH above about 6 and below 8, but preferably about 7, and no such requisite preconditioning is proposed. Were an untreated cation exchanger mixed with an alkali metal silicate solution according to the patented processes described, nearly immediate gelation of produced sol would result.

In the process of the present invention, no precaution is taken to allow the rate of exchangers of sodium and hydrogen ions to occur at a predetermined rate so as to maintain a pH as Na+ content within specific ranges. Instead, resin and silicate solution are mixed without any delayed addition time of either. Under these conditions, maximum nucleation of particles occur initially when the rate of exchanges is highest, producing sufficient nuclei initially so that growth of the nuclei by subsequent deposition of $SiO_2$ does not exceed 1–3 mu.

As a consequence of the failure of processes constituting the prior art to furnish silica sols possessing characteristics favorable to an optimum degree toward applications requiring high adhesiveness or adaptability toward emulsifying resins coupled with high water resistance, the desirability and need for processes capable of producing this type of sol is considerable, not only with respect to the achievement of the desired characteristics, but also due to the fact that such sols can as well be directed toward use in conventional applications of silica sols such as are involved as non-skid agents in waxes, textiles and papers, fillers for rubber, in treatment of rugs to prevent soiling, etc.

It is therefore a primary object of the present invention to provide a method for preparing stable silica sols which, in characteristics, is applicable to systems requiring high adhesiveness, or adaptability toward resin emulsions are far superior to those sols heretofore known in the prior art.

It is a further object that such sols correspondingly have an average particle diameter size of between about 1.0 to about 3.0 millimicrons, a silica/alkali metal oxide mol ratio of between about 4:1 to about 40:1 and a silica content of greater than 10%.

It is a further object to provide such a method for producing these uniquely small particle size sols and wherein the silica/alkali metal oxide mol ratio may be accurately predetermined.

Still further objects and advantages of the present invention will appear hereinafter.

The foregoing and related objects are accomplished according to the process of the present invention by means of mixing intimately a cation exchanger in the hydrogen form whose pH has previously been preconditioned to above about 6 (preferably in the range of 6–7), with a soluble metal silicate solution, preferably an alkali metal silicate solution, at approximately room temperature, and applying vigorous agitation to the mixture for a period of time sufficient to attain a particular desired silica/alkali metal oxide mol ratio, such period of time ordinarily being greater than about one hour. The resulting sol is subsequently separated from the cation exchanger and concentrated, if found necessary.

The soluble metal silicate employed is generally an alkali metal silicate and may include, for example, sodium or potassium silicates having a silica/alkali metal oxide mol ratio of from about 1:1 to about 4:1, however, it is ordinarily desirable that a relatively high ratio silicate be used in order to conserve the quantity of ion-exchanger required for the exchange. Normally, the silicate solution will be employed as a saturated or nearly saturated solution in order to obtain the highest possible concentration of silica in the resultant sol. The preferred silicates to be employed herein have been indicated to be the alkali metal silicates, however, it is the broad aspect of the invention that any soluble silicate may be used and it will be understood that when an alkail metal silicate is described as the silicate component during any portion of this disclosure, other soluble silicates may be employed as full equivalents. Sodium silicate is generally the least expensive and most accessible source of silica.

Cation exchange materials suitable for use in the processes of this invention are those substantially water insoluble substances which are capable of exchanging hydrogen ions for alkali metal cations and are of the type containing weakly acidic groups bonded to a cross-linked matrix. These cation exchangers may be prepared, for example, by condensing 1,3,5-resorcylic acid with formaldehyde or by polymerizing acrylic or methacrylic acid with about 19% of divinylbenzene. Many other types of suitable cation exchange resins are available and may be employed in the processes herein, for example, those derived from insoluble sulfonated humic material, from the introduction of sulfonic groups either into the ring or in methylene groups of insoluble phenol-formaldehyde condensation resins and from other water insoluble materials containing, in order of preference, phosphonic, phosphorous, phosphoric, carboxylic-sulfonic, nuclear sulfonic and methylene sulfonic exchange groups. The exchanger is generally prepared in granular form and practically should be of high stability under the particular alkalinity of the processes employed.

The method of this invention requires that the initial pH of the cation exchange material be above about 6. In order that the ion exchange material be utilized most effectively, it is generally preferred not to adjust to above about 7 because of loss of resin capacity. Thus, the cation exchanger, for example, a weakly acidic carboxylic type, is first equilibrated with an aqueous solution of a strong base until its pH increases to above about 6 before introduction into the mixing zone. Upon completion of an exchange process, the cation exchange material is regenerated to the hydrogen form by washing with a solution of an acid such as hydrochloric, sulfuric, sulfamic, or formic; the regeneration being more effective if the regenerating acid is stronger than the acid groups on the exchange material.

The processes of this invention are generally conducted at about room temperature, more specifically in the range of between about 10° C. to about 40° C., the temperature selected being to a large degree dependent upon the nature of the cation exchanger employed. In the preferred aspect of the present invention, the exchange is effected at such a rate that the number of initially formed silica nuclei are in such proportion to the total amount of silica available in the form of silicate solution that the growth of said initially formed nuclei to their final particle size by assimilation of silicic acid formed subsequently during the exchange is of the order that the average particle diameter size of the resultant sol is between about 1.0 to about 3.0 millimicrons. The mechanism of exchange of typical weakly acidic carboxylic cation exchangers is such that this desired balance between initially formed nuclei and total silica content is ordinarily achieved during the preferred temperature range, for example, at about room temperature. Exchanges carried out within the upper limits of the preferred range with weakly acidic cation exchangers are necessarily more rapid than would be the case at lower temperatures and consequently as a procedure alternative to that of conducting the exchange at one constant temperature is the system whereby the exchange is first conducted at a relatively low temperature, for example, at about room temperature, in order to form initial nuclei at a moderate rate and thereafter gradually increasing such temperature, thereby advancing the rate of exchange and reducing the total time required for the completion of the ion exchange.

The control of temperature is one factor determining that the ultimate average particle size of the resultant sols shall be within about 1.0 to about 3.0 millimicrons in diameter, however, it will be understood that the processes of this invention may be carried out under conditions beyond those described as being preferred for certain purposes other than the attainment of sols having the aforementioned uniquely small sized silica particles. Hence, it is within the scope of the present invention that employment of a temperature range from just above the freezing point of the exchange mixture to about its boiling point may be suitable under some special conditions.

An integral embodiment of the present invention is the means whereby the ultimate silica/alkali metal oxide mol ratio may be precisely predetermined by manipulations in the total amount of ion exchange capacity available per unit of silica represented as silicate or by controlling the period of time alloted per exchange reaction. Of vital concern to the stability of the sols prepared by processes herein disclosed is the particularly low silica/alkali metal oxide mol ratio preferably achieved since it is a property of silica sols that their stability is a matter of balance between the average particle diameter size and the silica/alkali metal oxide mol ratio, said ratio varying directly with the average particle diameter size in the achievement of stability. It is proposed therefore that in order to obtain, in the sol products of the present invention, a stability sufficient for the conditions for which they are designed, a silica/alkali metal oxide mol ratio of no greater than 40:1 be attained, said ratio being above about 4:1 as the lower limit.

A desired silica/alkali metal oxide ratio, hereinafter designated as $SiO_2/M_2O$, may be attained in the resultant sol by means integrated with the exchange processes, such means preferably are by two techniques: (1) employment of equivalent amounts of silicate and cation exchanger or excess of cation exchanger with subsequent variations in degree of completion of exchange; (2) employment of excess of silicate in specific predetermined amount with subsequent complete exchange.

In the case (1), wherein there is employed a ratio of total cation exchange capacity available through the cation exchanger to the total equivalents of alkali or other metal cation constituting a soluble silicate of no less than unity, the rate of exchange will be of such rapidity that an exchange will be completed over a comparatively short period of time, producing a sol with an undesirably high $SiO_2/M_2O$ and consequently of inadequate stability. The attainment, in these instances of a suitable $SiO_2/M_2O$ in the resultant sol, must be accomplished by curtailing the exchange before completion by a period of time determined by the particular $SiO_2/M_2O$ desired. The correspondence between resultant $SiO_2/M_2O$ and period of exchange for a particular cation exchanger silicate system may be determined, for example, by graphical means wherein time of contact plotted versus resultant $SiO_2/M_2O$ allows the extrapolation of the period of exchange necessitated for the achievement on a particular desired $SiO_2/M_2O$.

In the case (2), wherein the ratio of total ion exchange capacity to total equivalents of metal cation is less than unity, the exchange will terminate before all the metal cation has been extracted from the silicate solution, yielding a sol having a $SiO_2/M_2O$ determined by the relationship:

$$C = \frac{W}{R_1} - \frac{W}{R_2}$$

where C is the total ion exchange capacity of the cation exchanger expressed in mol equivalents per dry gram of exchanger, W is the total amount of silica contained in the silicate solution expressed in mol equivalency, $R_1$ is the $SiO_2/M_2O$ of the metal silicate, and $R_2$ is the $SiO_2/M_2O$ of the resultant sol. Consequently, since for a particular metal silicate, W and $R_1$ are fixed, $R_2$ becomes a direct function of C and can be varied during a series of exchanges by corresponding variations in the amount of cation exchanger used for each particular exchange. It is necessary to allow sufficient time for the exchange reaction to go to completion when employing a deficiency of cation exchanger.

In an operation of one of the processes of this invention, a particular cation exchange material is selected and the procedure established by which the ultimate particle size of the resultant sol will be determined. A silicate solution of a desired $SiO_2/M_2O$ will be mixed with the cation exchanger in a suitable vessel, the temperature brought to a desired level and vigorous agitation applied for a period of time consistent with the ultimate $SiO_2/M_2O$ desired. The mixture of resultant sol and cation exchanger is then treated to separate the sol, for example, by use of centrifugation, filtration or decantation. The cation exchanger is washed free of adhering silica sol and regenerated with acid as hereinbefore described. The sol is concentrated, if necessary, to a desired silica content by means of evaporation or by other means known in the art. Silica contents as high as 25% can be achieved in sols whose $SiO_2/M_2O$ ratios are in the lower portion of the preferred range, but decreases as the $SiO_2/M_2O$ ratio is increased. The sol may be adjusted to a particular pH level, such as within the range between about 9.5 to about 10.5 to insure stability during a concentration step or during storage. This adjustment of pH may be accomplished by means of addition to the sol of small amounts of hydrogen-form cation exchange resins, alkali metal hydroxide or alkali metal silicate.

In order to demonstrate the utility of the sols produced by the process of this invention, the following data on silica sols of different size relationships are presented. Included are sols having an average particle diameter of about 1.4 millimicron, said sols being of the present invention, and two commercially available silica sols having average particle diameters of 5.2 and 15.0. The sols were used as modifiers in various resin emulsion systems and tested for film clarity, water resistance and adhesion to simulate their use as protective coatings upon glass.

|  | Average Particle Sizes of Sol in Millimicrons | | |
|---|---|---|---|
|  | 1.4 | 5.2 | 15.0 |
| (1) Resin emulsion system: | | | |
| Flexbond 800 | clear | clear | cloudy. |
| Polytex 600 | do | do | Do. |
| Dow 762 K | do | sl. cloudy | Do. |
| (2) For water resistance | | | |
| Flexbond 800 | excellent | fair | poor. |
| Polytex 600 | good | do | Do. |
| Dow 762 K | excellent | good | Do. |
| (3) Adhesion: | | | |
| Flexbond 800 | do | fair | Do. |
| Polytex 600 | do | do | Do. |
| Dow 762 K | do | poor | Do. |

The sols prepared according to this invention are below the practical resolution limits of the electron microscope (<5 mu). In order to estimate the size, a method based on the rate of depolymerization of colloidal silica in dilute caustic was applied. According to O'Connor and Greenberg (Journal of Physical Chemistry, 62, 1195 (1958)), the rate of depolymerization (dissolution) of colloidal silica is given by the equation $C_p{}^{1/3} = C_{po}{}^{1/3} - K_3 t$, where $C_{po}$ is the initial concentration of colloidal silica, $C_p$ the concentration at any given time $t$, and $K_3$ is a constant. The constant $K_3$ is proportional to $K \cdot V^{1/3}$, where V is the number of particles. In systems in which the total $SiO_2$ contents are equivalent, the number of particles present can be compared by the relationship $$V_b = \frac{V_a (K_3 b)^3}{(K_3 a)^3}$$

and the relative diameters of the colloidal particles is $$d_b = \frac{d_a (K_3 a)}{(K_3 b)}$$

where $a$ and $b$ subscripts refer to sols of different particle size, and $d$ is the average diameter size of the particles.

In carrying a particle size determination by this method, the rate of depolymerization of silica sols is determined in 1 liter of .025 N NaOH containing 1.60 grams of $SiO_2$ as colloidal silica at 55° C. The rate of depolymerization is measured by following the change in resistance of the solution with time. $(R\infty - R_0)$, where $R\infty$ is the electrical resistance in ohms of the solution after complete solution of the silica sol, and $R_0$ is the resistance of the mixture at the start of the reaction, is a measure of the instantaneous polymer concentration, and the slope of the line obtained by plotting $(R\infty - R_0)^{1/3}$ vs. time is proportional to $K_3$. Thus a sol of unknown size can be evaluated by comparison of its depolymerization slope with the slope from a sol of known size according to the previous equation. A sol of 23 mu (essentially monodisperse), whose size was determined by electron microscopy, was used as a standard. The particle diameter of an unknown sol was calculated from the equation $$(\text{unknown}) = 23 \text{ mu} \left( \frac{\text{slope of known}}{\text{slope of unknown}} \right)$$

In order that the invention be better understood, the following examples are presented which are not, however, to be construed in a limiting sense.

*Example 1*

Sufficient cation exchange resin (IRC–50 in the hydrogen form comprising a weak carboxylic-type ion exchange synthetic resin) was added to deionized water in a stainless steel tank to give a settled volume of resin of 2.5 liters. Sodium hydroxide (approximately 4 N) was added to the agitated mixture to adjust the pH of the resin-water slurry to 7 as determined with a Beckman model G pH meter. This adjustment was carried out so as to maintain a pH of 7 on standing several hours after the addition of sodium hydroxide. The water was then drained from the resin bed and replaced with 30.1 liters of deionized water.

Sodium silicate, 27.3 liters containing 29.5% $SiO_2$ and 9.0% $Na_2O$, was added to the agitated resin-water mixture as rapidly as possible. The exchange was carried out at room temperature over a 7-hour period. The ion exchange material was then separated from the sol.

The sol contained 14.2% $SiO_2$ at an $SiO_2$, $Na_2O$ ratio of 14.2 and has not gelled on standing over 1 year. The particle sizes could not be resolved by electron microscopy, thus indicating a particle size less than 5 mu, and by comparison of the depolymerization rate of this sol with one of known size in .025 N NaOH at 55° C., the size was found to be 1.4 mu.

*Example 2*

To 18.8 liters of hydrogen-form wet settled resin (IRC–50) in a 15-gallon polyethylene-lined drum, 4 N sodium hydroxide was added to bring the pH to 7 from an initial value of 3.5. All the free water was drained from the resin and replaced with 17.42 liters of deionized water. 15.79 liters of sodium silicate solution 29.5% $SiO_2$ with a $SiO_2$:$Na_2O$ ratio of 3.28, was poured into the drum, while stirring the resin water slurry. The drum was then capped and placed on rollers for 6 hours at 30 r.p.m. The sol was separated from the resin by filtration through Orlon cloth.

The average particle size of this sol determined by comparing rates of depolymerization of this sol with one of known diameter was 2.4 mu. The sol contained 15.17% $SiO_2$ with a $SiO_2$:$Na_2O$ ratio of 18.8, and has been stable against gelation for 2 years.

*Example 3*

To 2000 grams of IRC–50 resin previously conditioned to a pH7 with $Na_2Co_3$ and drained of free water was added 1640 grams of deionized water. The resin-water mixture was placed in a polyethylene bottle and 6760 grams of sodium silicate solution of the composition of the previous examples was added. The bottle, at room temperature, was placed on a mechanical shaker for 18 hours. The sol analyzed 23% $SiO_2$ with a $SiO_2$:$Na_2O$ mole ratio of 4.53 and was stable to gelation for over 2 years.

*Example 4*

4445 grams of sodium silicate of the compositions of the above examples was placed in a polyethylene bottle and diluted with 3555 grams of deionized water. 3555 grams of IRC–50 resin previously preconditioned to pH 6 with NaOH and drained of free water was added with vigorous stirring to the diluted sodium silicate solution. The bottle was capped and placed on a mechanical shaker for 4 hours.

The sol drained from the resin contained 14.8% $SiO_2$ at a $SiO_2$:$Na_2O$ mole ratio of 14.2 and a particle size of 1.0 mu.

Having thus described our invention, we claim:

1. A process for producing a stable silica sol comprising adjusting the pH of a cation exchange material to above about 6 and below 8, adding a soluble metal silicate solution thereto, agitating and maintaining the temperature of the mass between about 10° C. to about 40° C., and separating the resulting silica sol from the cation exchange material.

2. The method of claim 1, wherein the pH of the cation exchange material is adjusted to about 7.

3. The method of claim 1, wherein the ion exchange material is a weakly acidic carboxylic type ion exchange resin.

4. A process for producing a stable silica sol comprising adding sufficient alkali metal base solution to a slurry of a cation exchange material to adjust the same to a pH of above 6 and below 8, adding a soluble metal silicate solution thereto, simultaneously agitating and maintaining the temperature of the mass between about 10° C. to about 40° C., and separating the resulting silica sol from the cation exchange material.

5. The method of claim 4, wherein the metal silicate solution is a substantially saturated alkali metal silicate solution.

References Cited in the file of this patent

UNITED STATES PATENTS

| | | |
|---|---|---|
| 2,631,134 | Iler et al. | Mar. 10, 1953 |
| 2,668,149 | Iler | Feb. 2, 1954 |